United States Patent
Whitman (10) Patent No.: US 11,645,301 B2
(45) Date of Patent: *May 9, 2023

(54) CROSS MEDIA RECOMMENDATION

(71) Applicant: SPOTIFY AB, Stockholm (SE)

(72) Inventor: Brian Whitman, Cambridge, MA (US)

(73) Assignee: Spotify AB, Stockholm (SE)

( * ) Notice: Subject to any disclaimer, the term of this patent is extended or adjusted under 35 U.S.C. 154(b) by 478 days.

This patent is subject to a terminal disclaimer.

(21) Appl. No.: 16/749,622

(22) Filed: Jan. 22, 2020

(65) Prior Publication Data

US 2020/0159744 A1    May 21, 2020

Related U.S. Application Data (63) Continuation of application No. 15/420,311, filed on Jan. 31, 2017, now Pat. No. 10,558,682, which is a
(Continued)

(51) Int. Cl.
*G06F 16/26* (2019.01)
*G06N 5/00* (2006.01)
(Continued)

(52) U.S. Cl.
CPC ........ *G06F 16/26* (2019.01); *G06F 16/24578* (2019.01); *G06F 16/435* (2019.01);
(Continued)

(58) Field of Classification Search
CPC .. G06F 16/26; G06F 16/24578; G06F 16/435; G06F 16/635; G06F 16/68;
(Continued)

(56) References Cited

U.S. PATENT DOCUMENTS 6,438,579 B1 * 8/2002 Hosken ............... G06F 16/9535
707/999.005
7,075,000 B2 * 7/2006 Gang ................... G06F 16/637
84/600
(Continued)

FOREIGN PATENT DOCUMENTS

EP      2 207 348 A2    7/2010
EP       2207348 A2 *   7/2010   ....... G06F 17/30867
(Continued)

OTHER PUBLICATIONS

The Echo Nest Musical Fingerprint Ellis et al. (Year: 2010).*
(Continued)

*Primary Examiner* — Brian M Smith
*Assistant Examiner* — Ababacar Seck
(74) *Attorney, Agent, or Firm* — Merchant & Gould P.C.

(57) ABSTRACT

Methods, systems and computer program products are provided for cross-media recommendation by store a plurality of taste profiles corresponding to a first domain and a plurality of media item vectors corresponding to a second domain. An evaluation taste profile in the first domain is applied to a plurality of models that have been generated based on relationship among the plurality of taste profiles and the plurality of media item vectors, and obtain a plurality of resulting codes corresponding to at least one of the plurality of media item vectors in the second domain.

12 Claims, 6 Drawing Sheets

Related U.S. Application Data continuation of application No. 14/213,749, filed on Mar. 14, 2014, now Pat. No. 9,613,118.

(60) Provisional application No. 61/802,971, filed on Mar. 18, 2013.

(51) Int. Cl.

| | |
|---|---|
| *G06N 7/00* | (2006.01) |
| *G06N 20/00* | (2019.01) |
| *G06F 16/68* | (2019.01) |
| *G06F 16/435* | (2019.01) |
| *G06F 16/635* | (2019.01) |
| *G06F 16/735* | (2019.01) |
| *G06F 16/2457* | (2019.01) |
| *G06N 5/02* | (2006.01) |
| *G06N 20/10* | (2019.01) |
| *G06N 5/025* | (2023.01) |

(52) U.S. Cl.
CPC ............ *G06F 16/635* (2019.01); *G06F 16/68* (2019.01); *G06F 16/735* (2019.01); *G06N 5/003* (2013.01); *G06N 7/005* (2013.01); *G06N 20/00* (2019.01); *G06N 20/10* (2019.01); *G06N 5/025* (2013.01)

(58) Field of Classification Search
CPC ...... G06F 16/735; G06N 5/003; G06N 7/005; G06N 20/00; G06N 20/10; G06N 5/025
See application file for complete search history.

(56) References Cited

U.S. PATENT DOCUMENTS

| | | | | |
|---|---|---|---|---|
| 7,772,478 | B2* | 8/2010 | Whitman | G10H 1/00 84/603 |
| 7,783,249 | B2* | 8/2010 | Robinson | G06Q 10/00 455/3.06 |
| 7,945,441 | B2* | 5/2011 | Thompson | G10L 15/02 704/230 |
| 8,332,425 | B2* | 12/2012 | Svendsen | G11B 27/105 707/769 |
| 8,385,662 | B1 | 2/2013 | Yoon et al. | |
| 8,660,370 | B1* | 2/2014 | Yoon | G06K 9/6223 382/116 |
| 9,110,955 | B1 | 8/2015 | Bernhardsson | |
| 10,854,186 | B1* | 12/2020 | Devireddy | G10K 11/178 |
| 2002/0199194 | A1* | 12/2002 | Ali | H04N 5/782 348/E7.071 |
| 2006/0242193 | A1 | 10/2006 | Dunning | |
| 2006/0259344 | A1 | 11/2006 | Patel et al. | |
| 2007/0244880 | A1* | 10/2007 | Martin | G06F 16/48 707/999.005 |
| 2009/0210415 | A1* | 8/2009 | Martin | G06F 16/48 707/999.005 |
| 2010/0191689 | A1* | 7/2010 | Cortes | G06V 20/40 725/35 |
| 2011/0035705 | A1* | 2/2011 | Faenger | G06F 16/4387 715/810 |
| 2011/0219028 | A1* | 9/2011 | Dove | G06F 16/00 707/E17.014 |
| 2011/0288929 | A1 | 11/2011 | Mei et al. | |
| 2011/0293180 | A1* | 12/2011 | Criminisi | G06T 7/11 348/46 |
| 2012/0041969 | A1* | 2/2012 | Priyadarshan | G06Q 30/02 707/769 |
| 2012/0123854 | A1* | 5/2012 | Anderson | G06Q 30/0244 705/14.43 |
| 2012/0177294 | A1* | 7/2012 | Ke | G06F 16/5838 382/206 |
| 2012/0296908 | A1* | 11/2012 | Bach | G06F 16/683 707/E17.089 |
| 2013/0332842 | A1 | 12/2013 | Bemhardsson et al. | |
| 2014/0046945 | A1* | 2/2014 | Deolalikar | G06F 16/345 707/737 |
| 2014/0114985 | A1* | 4/2014 | Mok | G06Q 30/0271 707/748 |
| 2014/0222422 | A1* | 8/2014 | Sarikaya | G06F 16/3338 704/231 |
| 2014/0279756 | A1 | 9/2014 | Whitman | |
| 2014/0304265 | A1 | 10/2014 | Topakas et al. | |
| 2015/0248618 | A1 | 9/2015 | Johnson | |
| 2017/0139912 | A1 | 5/2017 | Whitman | |

FOREIGN PATENT DOCUMENTS

| | | | | |
|---|---|---|---|---|
| WO | 2005/038666 A1 | 4/2005 | | |
| WO | WO-2009057103 A2 * | 5/2009 | ............ | G06Q 30/02 |

OTHER PUBLICATIONS

Web-Scale Media Recommendation Systems Dror et al. (Year: 2012).*
A Multilayer Ontology-based Hybrid Recommendation Model Cantador et al. (Year: 2008).*
Modeling Semantic Aspects for Cross-Media Image Indexing Monay et al. (Year: 2007).*
Content-Based Profiling of Image Collections—A SOM-Based Approach D. Deng Department of Information Science, University of Otago, New Zealand (Year: 2004).*
Int'l Search Report and Written Opinion of the Int'l Searching Authority for Int'l Pat Appl'n No. PCT/US2014/029234, dated Jun. 25, 2014, (10 pages).
Y. Shi et al.; "Tags as Bridges between Domains: Improving Recommendation with Tag-Induced Cross-Domain Collaborative Filtering"; User Modeling, Adaption and Personalization; Springer Berlin Heidelberg; Berlin; Jul. 11, 2011; pp. 305-316.
Daniel P.W. Ellis, et al., "The Echo Nest Musical Fingerprint", 2010.
Paolo Cremonesi, et al., "Cross-domain Recommender Systems", IEEE—2011.
Scikit-learn: Machine Learning in Python, Pedregosa et al., JMLR 12, pp. 2825-2830, 2011.
Int'l Preliminary Report on Patentability issued in connection with Int'l Appln. No PCT/US2016/047461 dated Mar. 20, 2018.
Collaborative Filtering. Wikipedia. N.p., n.d. Web. Jul. 18, 2015. <https://en.wikipedia.org/wiki/Collaborative_filtering>.
Koren, Yehuda, Robert Bell, and Chris Volinsky. "Matrix Factorization Techniques for Recommender Systems." Computer 8 (2009): 42-49. Web. Jul. 18, 2015. <http://www2.research.att.com/-volinsky/papers/ieeecomputer.pdf>.
Johnson, Christopher C. "Logistic Matrix Factorization for Implicit Feedback Data." NIPS. Web. Jul. 18, 2015. <http://stanford.edu/-rezab/nips2014 workshop/ submits/lo gmat. pelf>.
Google, Word2vec, https://code.google.eom/p/word2vec (last visited Feb. 2, 2016).
The Echo Nest™, Acoustic Attributes Overview, http://developer.echonest.com/acoustic-attributes.html (last visited Feb. 2, 2016).
Scikit-Learn Developers, Scikit Implementation (http://scikit-learn.org/stable/modules/linear_model.html#logistic-regression) (last visited Feb. 2, 2016).
Dato, GraphLab Create™ API—Factorization Recommender (https :// dato. com/products/ create/ docs/ generated/graphlab.recommender.factorization_recom mender.FactorizationRecommender.html) (last visited Feb. 2, 2016).
Rendle, S., Factorization Machines, Data Mining (ICDM), 2010 IEEE 10th International Conference on, pp. 995-1000 (Dec. 13, 2010), http://www.csie.ntu.edu.tw/-b97053/paper/Rendle2010FM.pdf.
European Communication pursuant to Article 94(3) EPC in Application 14716738.1, dated Jun. 1, 2017, 6 pgs.
European Decision to Refuse a European Patent Application in Application 14716738.1, dated Jun. 19, 2018, 15 pages.
European Result of Consultation in Application 14716738.1, dated May 17, 2018, 10 pages.

(56) References Cited

OTHER PUBLICATIONS

European Summons to Attend Oral Proceedings in Application 14716738.1, mailed Nov. 20, 2017, 10 pages.
PCT International Preliminary Reporton Patentability in Application PCT/US2014/029234, dated Oct. 1, 2015, 8 pages.

* cited by examiner

Music Taste Record — 301

| TPID | Artist ID | Play# | ... |
|------|-----------|-------|-----|
| CA1234 | AR1234 | 7 | |

Inverted Indices — 401

AR1234 → [f3x89, f4x96,...]
Sexy → [f2x01, f3x89,...]
Beyonce → [f3x89]

| Field | Example |
|---|---|
| Musical artist (boosted by weight) | ["Aerosmith":10, "Lindstrom":5, "David Bowie":2] |
| Song plays | ["Band on the Run":14, "Fire":3, "Stairway to Heaven":9] |
| Movie preference | ["Stalker", "Until the end of the world", "The Rock"] |
| Book preference | ["Vineland", "The Tin Drum", "The Girl With the Dragon Tattoo"] |

502 = first two rows; 504 = last two rows

| Weighted Term Vector | Output Class |
|---|---|
| $WTV_0$ ------------------------------> | $OC_a$ |
| $WTV_0$ ------------------------------> | $OC_b$ |
| $WTV_0$ ------------------------------> | $OC_c$ |
| $WTV_1$ ------------------------------> | $OC_d$ |
| $WTV_1$ ------------------------------> | $OC_e$ |
| * | |
| * | |
| * | |
| $WTVn$ ------------------------------> | $OC_X$ |

CROSS MEDIA RECOMMENDATION

CROSS-REFERENCE TO RELATED APPLICATION

This application is a continuation of U.S. patent application Ser. No. 15/420,311, filed Jan. 31, 2017, which is a continuation of U.S. patent application Ser. No. 14/213,749, filed Mar. 14, 2014, which claims priority to U.S. Provisional Application No. 61/802,971, filed Mar. 18, 2013, the contents of which are incorporated herein by reference.

BACKGROUND

I. Field

Example aspects described herein generally relate to media recommendation and, more particularly, to cross-media recommendation.

II. Related Art

Cross-media recommendation, also known as cross-domain recommendation, utilizes user preferences in one domain (e.g., music) to suggest recommendations in another domain (e.g., books). The problem of using data across separated domains is not trivial. One conventional way of providing cross-media recommendation is to combine two or more domain systems into one system and then generate a recommendation using traditional one-domain methods, for example, by basing the recommendation on user ratings and characteristics about the items themselves (e.g., title, song, type of product, sales, etc.).

Known techniques cannot easily deal with users who have made very few ratings. Moreover, the huge collections of heterogeneous media data might not contain the same descriptors, making it difficult for existing recommender systems to find patterns or correlations across domains.

These types of issues have made it technically challenging for media recommender providers to develop services and products that can make an accurate recommendations for a specific person that maximizes the diversity of media across multiple domains.

BRIEF DESCRIPTION

The example embodiments described herein meet the above-identified needs by providing systems, methods and computer program products for providing cross-media recommendation. In one embodiment, a system for cross-media recommendation is provided. A first database stores a plurality of taste profiles corresponding to a first domain and a second database stores a plurality of media item vectors corresponding to a second domain. At least one processor is configured to apply an evaluation taste profile in the first domain to a plurality of models generated based on relationship among the plurality of taste profiles and the plurality of media item vectors, and obtain a plurality of resulting codes corresponding to at least one of the plurality of media item vectors in the second domain.

The processors can also be configured to generate a training set based on the plurality of taste profiles and the plurality of media item vectors and train the plurality of models based on the training set. In one example embodiment, the first domain is music and the second domain is any one, or a combination of, books, movies, or games.

In another embodiment, the at least one processor is further configured to generate a plurality of weighted term vectors based on the plurality of taste profiles, generate vector quantized media data by vector quantizing the plurality of media item vectors, and generate a map of the weighted term vectors to the vector quantized media data. The plurality of weighted term vectors are generated by multiplying, for each term in a taste profile, an affinity by a probabilities that the term is associated with a media item. In addition, the plurality of media item vectors are vector quantized by applying the plurality of media item vectors to a k-means clustering algorithm. It should be understood that other clustering algorithms can be used in place of the k-means clustering algorithm.

In another embodiment, there is provided a non-transitory computer-readable medium having stored thereon one or more sequences of instructions for causing one or more processors to perform storing a plurality of taste profiles corresponding to a first domain, storing a plurality of media item vectors corresponding to a second domain, applying an evaluation taste profile in the first domain to a plurality of models generated based on relationship among the plurality of taste profiles and the plurality of media item vectors, and obtaining a plurality of resulting codes corresponding to at least one of the plurality of media item vectors in the second domain.

In one embodiment, the computer-readable medium further has stored thereon a sequence of instructions which when executed by the computer system causes the computer system to perform generating a training set based on the plurality of taste profiles and the plurality of media item vectors and training the plurality of models based on the training set. The first domain can be music and the second domain can be any one, or a combination of, books, movies, or games.

In another embodiment, the computer-readable medium has stored thereon a sequence of instructions which when executed by the computer system causes the computer system to perform generating a plurality of weighted term vectors based on the plurality of taste profiles, generating vector quantized media data by vector quantizing the plurality of media item vectors, and generating a map of the weighted term vectors to the vector quantized media data. The weighted term vector is generated by multiplying, for each term in a taste profile, an affinity by a probabilities that the term is associated with a media item. The plurality of media item vectors are vector quantized by applying the plurality of media item vectors to a k-means clustering algorithm. It should be understood that other clustering algorithms can be used in place of the k-means clustering algorithm.

Another embodiment provides a method for cross-media recommendation. The method includes storing a plurality of taste profiles corresponding to a first domain, storing a plurality of media item vectors corresponding to a second domain, applying an evaluation taste profile in the first domain to a plurality of models generated based on relationship among the plurality of taste profiles and the plurality of media item vectors, and obtaining a plurality of resulting codes corresponding to at least one of the plurality of media item vectors in the second domain.

The method can also include generating a training set based on the plurality of taste profiles and the plurality of media item vectors and training the plurality of models based on the training set. The first domain is music and the second domain is any one, or a combination of, books, movies, or games.

In another embodiment, the method includes generating a plurality of weighted term vectors based on the plurality of taste profiles, generating vector quantized media data by vector quantizing the plurality of media item vectors, and generating a map of the weighted term vectors to the vector quantized media data.

The weighted term vector is generated by multiplying, for each term in a taste profile, an affinity by a probabilities that the term is associated with a media item. The plurality of media item vectors are vector quantized by applying the plurality of media item vectors to a k-means clustering algorithm.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments of the invention presented herein are directed to systems, methods and computer program products for providing a cross-media recommendation based on a user's preference in the domain of music. This description is not intended to limit the application of the example embodiments presented herein. In fact, after reading the following description, it will be apparent to one skilled in the relevant art(s) how to implement the following example embodiments in alternative embodiments (e.g., providing a cross-media recommendation based on a taste profile in another domain, such as video, game, book, shopping, and the like).

In one example embodiment, a taste profile (also referred to as a "catalog") is a named collection of media content items. In one example, a taste profile can be used as input to application programming interface (API) calls. Taste profiles can be configured to interact with software components by using other conventional means as well.

A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to mine music preferences. One mechanism for associating taste profiles with metadata is described in U.S. patent application Ser. No. 13/851,311, filed Mar. 27, 2013, entitled "REAL TIME MAPPING OF USER MODELS TO AN INVERTED DATA INDEX FOR RETRIEVAL, FILTERING AND RECOMMENDATION", which is hereby incorporated by reference in its entirety.

Figure 1:
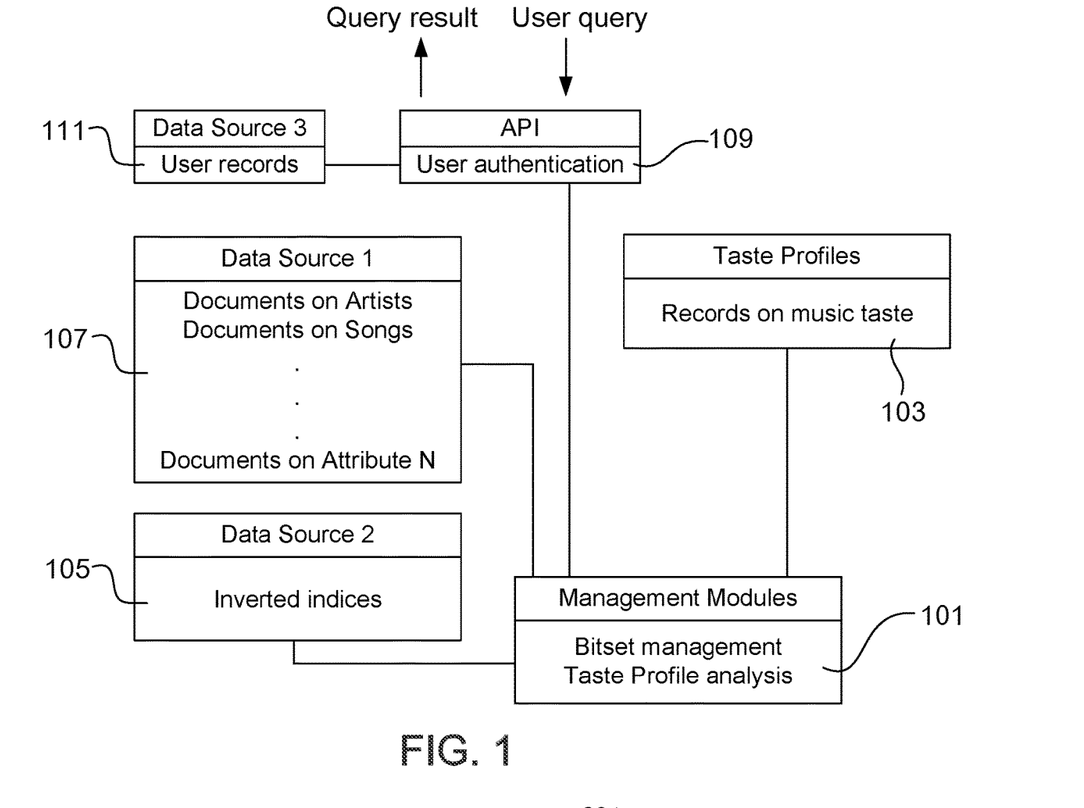
FIG. 1 is a representative view of a system in which some embodiments of the invention may be implemented.

FIG. 1 illustrates a representative view of a system in which some embodiments of the invention may be implemented. The environment comprises several modules, which may be embodied as, for example, computer hardware elements executing software, as described below with respect to FIG. 8.

As shown in FIG. 1, the system includes management modules 101, which control processing including taste profile analysis.

Taste profiles 103 contains records indicating the music taste (or other tastes) of users. In one example embodiment, each taste profile is a representation of musical activity, and may include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy", "sexy", etc. An exemplary taste profiles 103 data store is the open source relational database management system (RDBMS) that runs as a server providing multi-user access to a number of databases named MySQL. Further details of the taste profile are described below with respect to FIG. 3.

Non-music media data can be obtained by using, for example, term extraction analysis on various sources. Demographic insights, for example, can be obtained by obtaining information from social media and music sites. In the domain of books, for example, the terms can be key plot key words, author, whether or not the book was a best seller, and the like, extracted from online bookstore websites. For movies, the terms can include genre(s), actors, producers, and the like, obtained from online stores, movie, social, or movie-review websites. Non-music data can be stored in an independent database.

Figure 4:
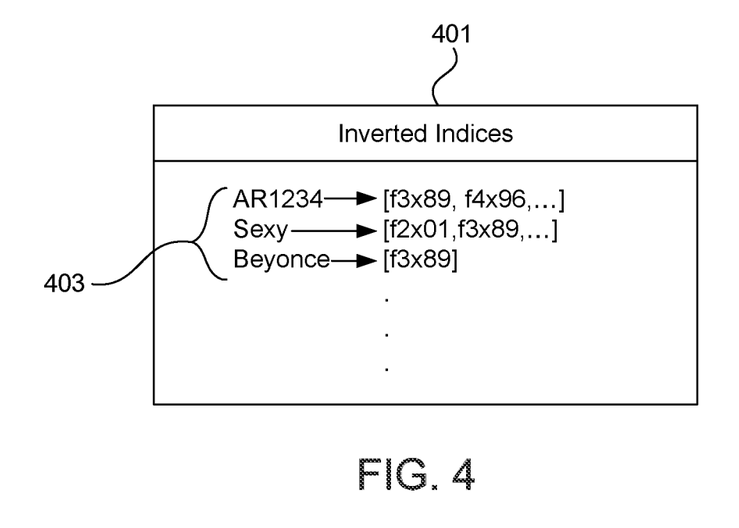
FIG. 4 depicts a representative view of inverted indices for terms associated with musical data according to an example embodiment.

Data source 105 contains records as inverted indices in which terms are indexes to documents for artist names or song titles. For example, the terms "Sexy", "R&B", and "Dance" might index to a document for artist "Beyonce", as described more fully below with respect to FIG. 4. An exemplary platform for storing such inverted indices is the open source enterprise search platform from the Apache project named Solr.

Data source 107 is a data set which contains (1) documents over various domains, such as artists and titles, and (2) terms and weights associated with each artist and/or each title. Such data is also referred to as metadata (i.e., data about data).

Figure 2:
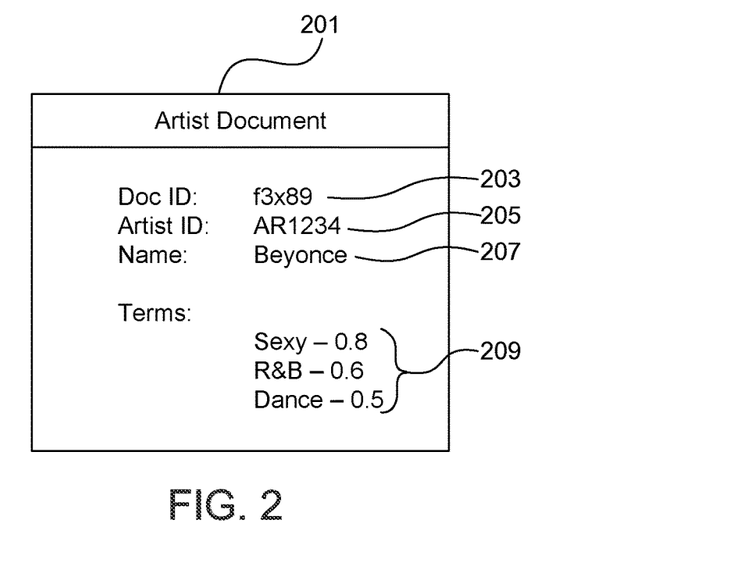
FIG. 2 illustrates a representative view of a set of musical data for an artist according to an example embodiment.

FIG. 2 illustrates an example document 201 according to such a data set. Document 201 contains a document ID 203 which uniquely identifies the document. In one embodiment, the domain concerns musical artists. In accordance with such a domain, document 201 contains an artist ID 205, an artist name 207, and a list of descriptions 209 related to a subject of the domain under consideration, in this case the artist. Each description is a term-weight pair, where the term describes the subject and the weight indicates how closely the term describes the subject. Data source 107 may store a wide range of terms associated with each artist name or song title, and may be updated at regular intervals, e.g., once per week or month.

For example, one example embodiment might include a data set including over 10,000 terms for each artist from various sources of data about music (or other media such as books, movies or games), along with associated weights. The terms may be weighted based on how important, how often mentioned or how closely related the term is to the artist. The terms may contain information about location, genre, style, marketing classifications, sales predictions, reviews, chat room dialogue transcriptions, biographies, recent news articles, time-dependent popularity and familiarity data, cultural analysis data, and the like. For example, the artist "Beyonce" might be associated with a vector of terms including "sexy", "R&B", "dance", etc., with corresponding weights of 0.8, 0.6 and 0.5. In another example, "Aphex Twin" might be represented not by a single entity, but rather by a vector of terms with probabilities, e.g., ["idm":0.9, "glitch":0.5, "hardcore":0.2], etc. Additional information regarding generation of terms and weights can be found in U.S. Pat. No. 7,772,478, entitled "Understanding Music", the contents of which are incorporated by reference herein.

API 109 is an application programming interface (API) used to communicate with a client device to receive or transmit information. In addition, API 109 may present a user interface to a client device or interact with a client device to receive input and display output.

User database 111 contains records having identification information of users. In this example, "user" may correspond to a customer such as a digital music, video or book service who submits a query on behalf of one or more of its customers. The particular request may come via a client device or a remote server of the content provider. "User" may correspond to a person or group whose musical tastes are being examined, as described more fully below. In either case, a user may or may not be required to register and/or input other data to the database. API keys may also be used to authenticate users. For example when an API call is made, an API key is passed to API 109 to authenticate the client device. Only the API key that calls the taste profile API can be used to receive the taste profile identifiers or information associated with the API key. For example, the API call may include an API key parameter that is used to identify the requestor (e.g., a developer or service provider). Only results associated with TPIDs associated with that requestor will be communicated (e.g., customers of the developer or service provider).

Taste profiles can be used to determine an individual's taste(s), for example for the purpose of making recommendations or playlists based on the individual's taste(s).

Figure 3:
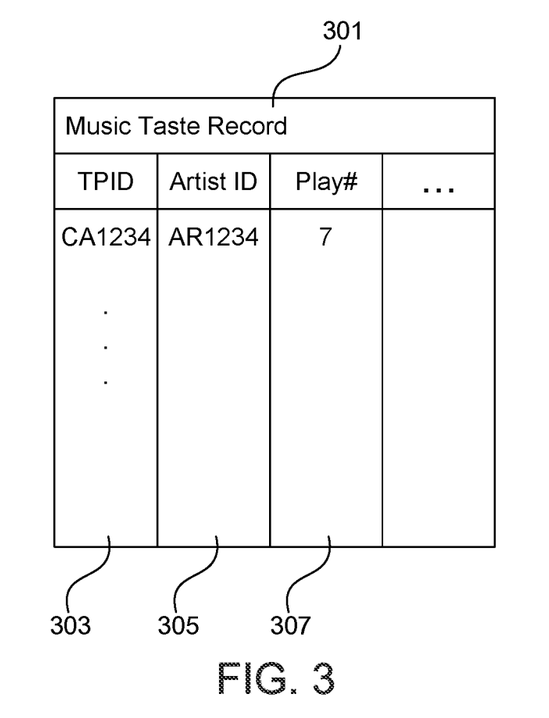
FIG. 3 illustrates a representative view of a taste profile according to an example embodiment.

FIG. 3 illustrates an entry in taste profiles 103, which contains records indicating user musical (or other) tastes. In one example embodiment, a taste profile is a representation of musical activity, and includes a wide range of information such as artist plays, song plays, skips, ratings by the user, date of listen by the user, songs per day, playlists, play counts, start/stop/skip data for portions of a song or album, contents of collections, user rankings, preferences, or mentions, etc. Thus, the taste profile data includes, in addition to an artist name or a song title, one or more of the following: length of listening activity for a song, length of listening activity for an album, and user actions during song or album play, such as fast forwarding, track skipping, stopping or pausing the song, or other media plays, such as websites visited, book titles, movies watched, playing activity during a movie or other presentations, ratings, or terms corresponding to the media, such as "comedy", "sexy", etc.

A taste profile can represent a single user or multiple users. Conversely, a single user or entity can have multiple taste profiles. For example, one taste profile could be generated in connection with a user's song play activity, whereas another separate taste profile could be generated for the same user based on the user's selection of songs/artists for a playlist.

In addition, taste profile data can also contain third party data about users (anonymous or otherwise) via the use of key-value information such as non-activity-related information (e.g., gender, age, and the like). Such information can be obtained, for example, from a service.

Social media sites can be examined to create anonymous users and anonymous taste profiles based on mentions of a song title or an artist. In another example, a third-party audio streaming service can update taste profiles based on song "events", such as streaming of a new song.

Accordingly, it should be understood that taste profiles need not be associated with particular end users and can instead be used for more general queries. Services may also generate their own taste profiles and filter those taste profiles. A radio station recommender, for example, can use one or more taste profiles to obtain similar results. In this example, the radio station recommender generates a taste profile associated with a radio station in general that is not necessarily associated with any particular listener(s) (referred to as a "radio station profile"). This can be accomplished for example, by generating a taste profile with a key/value store, and using this information to filter results. A 'type' key can be added to one or more taste profiles, to indicate whether the taste profile represents a listener, playlist, or the radio station.

An artist name or song title in a taste profile may be resolved from multiple different textual representations in a taste profile. For example, an artist or song might be commonly represented by multiple nicknames, abbreviations, formats, misspellings, aliases, and the like. Accordingly, the system may take raw text which might include these abnormalities and resolve them to a formal artist or song title. Such resolution could be performed in a server performing other aspects of the invention, or could be performed off-site in another device.

In addition, priority or preference values for a particular song or artist can be stored in the taste profile and can be weighted more heavily if, for example, an artists or song is listened to more frequently, or if a user has identified favorite artists or songs.

While the disclosure refers mainly to using musical data such as artist name or song title for purposes of clarity, it should be understood that the disclosure is not limited thereto. In particular, another media preference (e.g., book, movie or game preference) can be used instead of, or in combination with, musical data. For example, number of views or reads, mentions from social media networks, user settings, playlists or favorites lists can be obtained by crawling or mining this information from the web or other user data to determine preferences related to types of content other than music, for example, book, movie or game titles. Thus, according to the invention, the data set and corresponding terms and weights can be one of a musical data set, a book data set, a movie data set, a game data set, or some combination thereof.

In one example, the taste profile database 103 is updated continuously. For example, a record is added when a user listens to a new song, and the record is updated when an update of the user preference for the song is received via a client device. In one embodiment, the information received from the client device is stored in the database, the correct "matched" metadata is added, and a play count is initialized. For example, a taste profile update with "Britney Spears—Oops" gets resolved to the actual song ID and metadata for "Britney Spears" and "Oops, I Did It Again", with a play count of 1. If a fingerprint code (e.g., an audio fingerprint code) is sent to initialize a taste profile item, the system can resolve the fingerprint code to metadata and discard the fingerprint code. Taste profiles can also be generated by collecting text from any website which is publicly accessible including Facebook pages, Twitter feeds, Google+ pages, YouTube postings and the like, such as described in U.S. patent application Ser. No. 13/850,044, filed Mar. 25, 2013, entitled "NAMED ENTITY EXTRACTION FROM A BLOCK OF TEXT", which is hereby incorporated by reference in its entirety.

Referring back to FIG. 1, taste profiles 103 contain records indicating the music taste (or other tastes) of users. Each taste profile is a representation of musical activity, and may include a wide range of information. Taste profiles 103 can be implemented as one or more relational databases or in any other way that allows fast query processing and scaling.

Returning to FIG. 3, a record 301 in taste profiles 103 contains a taste profile ID 303 corresponding to a user. The record 301 may further contain various fields identifying a song, such as an artist ID 305 identifying the performer of the song, a play count 307, and an album number or track number identifying the medium of the song (not shown).

In addition, the record 301 may contain various fields indicating a user's affinity for the song, such as a play count 307 and a review. Affinity is a value representative of how connected particular taste profile activity is to a media content item (e.g., an artist, song, book, director, author, movie title, and the like). A high rating or high play count, for example, leads to a high affinity. In one example embodiment, affinity is computed by using a normalized weighting of the play counts or ratings across all the plays of the media content item in a taste profile. Affinity can also be based on, for example, skips, bands, favorites and other signals.

Each record 301 in the taste profile is used to produce, for each taste profile ID 303, a list of terms, where the length of the list generally ranges between 1 and 100,000. Each record 301 can be implemented as a covering index residing in RAM for fast random access by management modules 101.

Functionally, the API 109 takes a request from a client device, and authenticates users included in the request against the user database 111. Upon successful authentication, the request is passed to the management module 101. After the management module 101 performs processing to fulfill the request and sends the processing result back to the network, the API 109 outputs the processing result to the client device.

Other databases (not shown) may be communicatively linked to management modules 101. Such additional databases may store music requests each corresponding to one or more users, each representing a list of documents over a specific domain that is associated with specific users. Still other databases may contain records mapping a user to the list of records in the taste profile database 103.

Taste profiles can also be used to provide cross-media recommendations. In one exemplary embodiment, a cross-recommendation system is provided by preparing a training set consisting of multiple taste profiles that have been anonymized (e.g., on the order of two million taste profiles) and set of data corresponding to other domains that are linked to the taste profiles. For example, the music taste profiles and non-music taste profiles can be linked based on the particular user associated with the taste profile.

Figure 5:
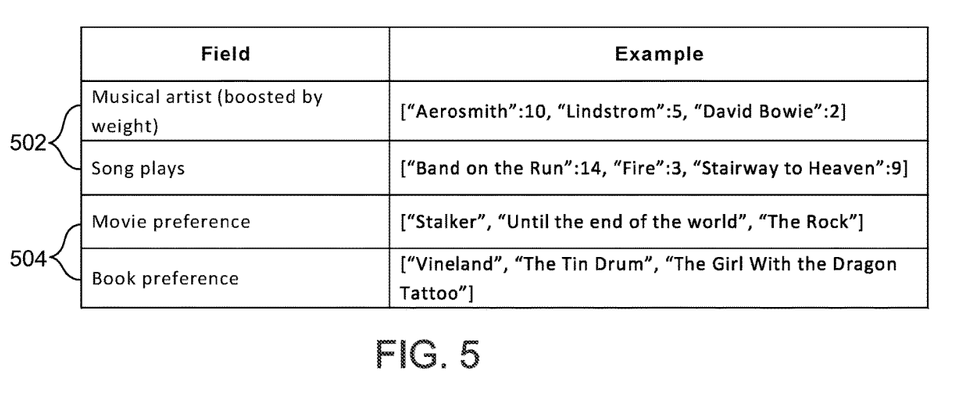
FIG. 5 illustrates an example snapshot of listening activity and artist preference alongside other demographic and media preference data according to an example embodiment.

FIG. 5 illustrates an example snapshot of listening activity and artist preference alongside other demographic and media preference data (books, movies, etc.) from various publicly available sources according to an example embodiment. In this example, the source data includes musical artists and song plays 502 and the target data includes movie and book preferences 504.

Figure 6:
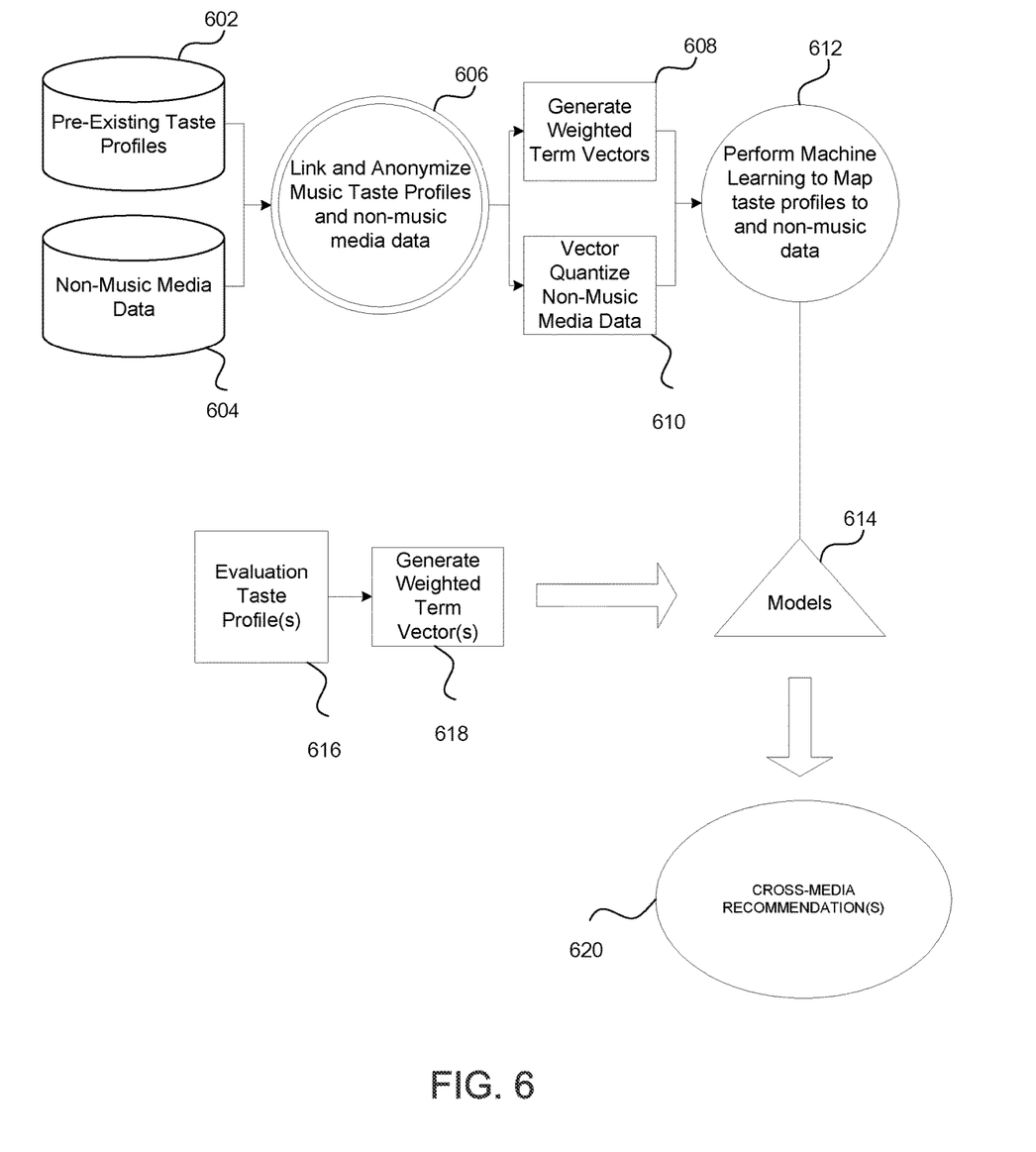
FIG. 6 is a diagram of an exemplary implementation according to an example embodiment.

FIG. 6 is a diagram of an exemplary implementation according to an example embodiment. Generally, models are trained based on the training set by using a machine learning system (e.g., neural network). Individual taste profiles, also referred to as evaluation taste profiles are then applied to the trained machine learning system to obtain output values which are used to retrieve one or more cross-media recommendations.

Initially, a training set is prepared. In this phase, pre-existing taste profiles 602 and non-music media data 604 are linked and anonymized as shown by process 606.

As explained above, a media item can be represented as a vector of terms, where each term has a probability that the terms are associated with that particular media item. In block 608, a weighted taste vector (WTV) is generated based on the terms in a taste profile by weighting the probabilities for each term by affinity. A vector (1) is generated by associating each term with its corresponding probability such that $$\{term_1:p_1, term_2:p_2, term_3:p_3, \ldots, term_n:p_n\} \quad (1)$$

where each $term_n$ is a term that describes media and each $p_n$ is the probabilities that those terms are associated with a media item.

Using the same example as above, the artist "Aphex Twin" can be represented by the vector of terms with probabilities: ["IDM":0.9, "glitch":0.5, "hardcore": 0.2, ..., $term_n$: $p_n$], where a $term_n$ (e.g., IDM, Glitch Hardcore, etc.) is a term that describes media (in this case a descriptor in the domain of music) and 0.9, 0.5, and 0.2 are the probabilities $p_n$ that those terms are associated with Aphex Twin.

Artists can have terms based on, for example, location, genre and style, biography, recent news articles, time-dependent popularity and familiarity data, and the like.

Audio signal processing can also be performed on media content to extract its acoustical features. For example, every song a listener might like can be analyzed to determine its tempo, key, rhythm structure, energy and danceability. The features can also be based on, for example, cultural analysis of the songs. These features are then cataloged for the terms in the taste profile (e.g., artists and songs).

Referring still to block 608, the weighted taste vector (WTV) (2) is generated by weighting the probabilities for each term by affinity, such that $$\{term_1:n_1*p_1, term_2: n_2*p_2, term_3: n_3*p_3, \ldots, term_n: n_n*p_n\} \quad (2)$$

where each $term_n$ is a term that describes media (e.g., a descriptor), each $p_n$ is the probabilities that those terms are associated with a media item, and each $n_n$ is the number of times a user has listened to a media item corresponding to the descriptor.

In one example embodiment, this is accomplished by multiplying the affinities by the probabilities. In the following example, the affinity is the number of times a user has listened to a particular artist or song. In this example, a user that has listened to five (5) Madonna songs and one (1)

Aerosmith song in their taste profile might have the following weighted-taste vector (WTV):

{"sexy":5*0.58,"female vocalist":5*0.94,"Boston rock":1*0.39} where "sexy", "female vocalist" are associated with the Madonna songs and "Boston rock" is associated with the Aerosmith song and 0.58, 0.94 and 0.39 are the probabilities associated with the terms, correspondingly. It should be understood that the number of terms that can be included in the WTV is not so limited and can be set to any number. Example techniques for computing the probabilities are described in U.S. Pat. No. 7,772,478, entitled "Understanding Music", the contents of which are incorporated by reference herein.

After aggregating all the terms for all of the songs and artists in a musical taste profile and weighting them by affinity, a mapping of the music and non-music data is constructed by applying a machine learning algorithm to the generated WTVs and the non-music media data, as shown in block 612.

To make this a classification problem, the term vectors (i.e., terms and probabilities) for each non-music media type are quantized into binary classifiers as shown in block 610. This is accomplished by vector-quantizing the non-music media term vectors. A sparse mapping of all possible terms in the set is constructed using a set of N (e.g., 10,000) random non-music media term vectors, each with up to M (e.g., 100s) of individual term/probability components. In an example embodiment, a musical WTV is on the left side of the mapping (3) and the vector quantized terms of other media (e.g., movies, books, etc.) are on the right side of the mapping (3):

$$\text{WTV\_music} \rightarrow \text{VQ\_non\_music} \quad (3)$$

A VQ (vector quantization) algorithm, such as the k-means VQ algorithm, is applied to the sparse mapping to quantize the term/probability components into an N-dimensional representation. The k-means clustering partitions the N-dimensional representation into k clusters. In an exemplary embodiment, the number of unique clusters k is 1,024. For new non-music media term vectors, the top N (e.g., 5) VQ clusters are computed. The Euclidean distances of the data and the cluster centers are computed as well. In one example embodiment, if a non-linear clustering algorithm is used, such as independent components analysis, then it is not necessarily to store the Euclidean distance. Any metric distance measure can be used.

Other clustering algorithms can be used in place of the k-means clustering algorithm (e.g., singular value decomposition (SVD)). This creates a mapping between a non-music media term vector and a single number representing its closest cluster in a Euclidean space, along with a weight (e.g., its distance to the cluster, log-normalized so that a perfect match is 1). The single numbers corresponding to the non-music media term vector are also referred to output classes.

Figure 7:
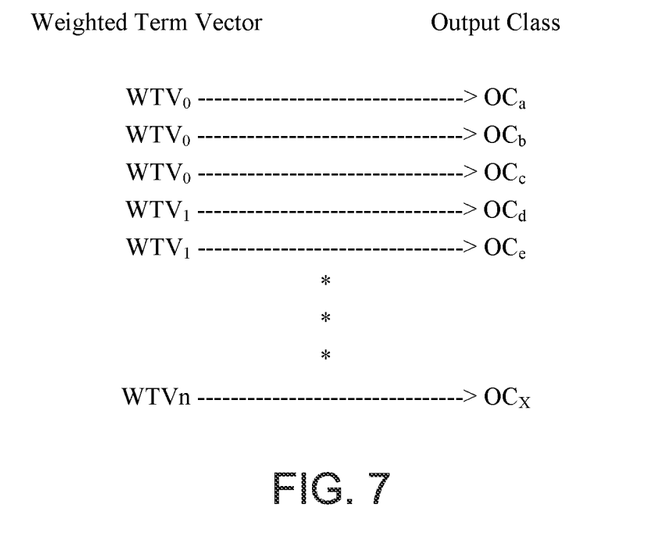
FIG. 7 is a mapping according to an example embodiment.

Each music taste profile is then mapped to its corresponding vector quantization code (VQ) as shown in FIG. 7, where $WTV_n$ is a weighted term vector and $VQ_x$ is a unique vector quantization code (or VQ code). It should be understood, however, that VQ codes can be repeated for different weighted term vectors. As shown below, $VQ_a$ is repeated for $WTV_1$ and $WTV_2$:

$$WTV\_1 \rightarrow VQ\_1$$

$$WTV\_1 \rightarrow VQ\_2$$

$$WTV\_1 \rightarrow VQ\_3$$

$$WTV\_1 \rightarrow VQ\_4$$

$$WTV\_1 \rightarrow VQ\_5$$

$$WTV\_2 \rightarrow VQ\_1$$

In one example implementation, $WTV_0$ corresponding to user ID 0 can be mapped to output classes 36 (e.g., corresponding to a horror film), 2 (e.g., corresponding to a fantasy movie) and 119 (e.g., corresponding to a television personality); $WTV_1$ corresponding to user ID 1 can be mapped to output classes 36 (e.g., corresponding to the horror film) and 262 (e.g., corresponding to a radio personality) as shown below:

$$WTV_0 \rightarrow 36$$

$$WTV_0 \rightarrow 2$$

$$WTV_0 \rightarrow 119$$

$$WTV_1 \rightarrow 36$$

$$WTV_1 \rightarrow 262$$

This sets up the machine learning problem, where on the left side are WTVs and on the right are single numbers corresponding to an output class.

Referring again to FIG, a vector machine (e.g., a relevance vector machine or RVM) is used to perform classifications as shown by process 612. The machine learning problem is configured such that the WTV is the training data and the VQ cluster (e.g., 0-1023) is the class. A Gaussian kernel is trained to support the vector machine to learn the relationship shown in FIG. 7, where up to 1024 models (one for each unique VQ code) that, given a new WTV, can output the probability of the WTV having affinity to that VQ code.

The WTVs are input to a training model, for example by a support vector machine (SVM). The training model is based on machine learning from ground truths from a random selection of data where target data has been filled in and is held back during evaluation so that the evaluation task has never seen the input data before. For example, a training model might use a database of one million taste profiles, which, as mentioned above, includes snapshots of detailed listening activity and artist preference, alongside other demographic data and media preference data from various publicly available sources across different domains. One half of the one million might be test data for which certain ground truths are known, i.e., person x likes classical and country music, and likes the Harry Potter movies. In an exemplary embodiment, the test data has an even distribution of false and positive examples, e.g., half of each.

For these taste profiles used in the learning model, there is ordinarily little or no need to collect names or any other directly identifiable information. Thus, for example, each taste profile may be anonymized and given an ID and any other non-music media preference data can be stored elsewhere linked to the taste profile.

The test data can comprise a set of data determined to be associated with the target metric, as a ground truth for the learning model. The learning model trains on these ground truths, and then predicts non-music media item for new (input) taste profiles based on the model. The training model may use support vector machines (SVM) to train a model of profiles to a class output. For example, multiple instances of a taste profile can be used, and a non-linear distance function (e.g., the kernel method) can be used as a target function.

The value of the evaluation kernel for new data is the "score" for the affinity between a new taste profile and the target.

In an example embodiment, in the learning model, a linear SVM can be used for Vector A and a Gaussian RBF kernel SVM can be used for Vector B. Automatic regularization detection can also be used as described in U.S. Pat. No. 7,772,478.

The training model may give an output class of 0 or 1 (or negative or positive) for each input sparse vector, along with a confidence interval from the SVM classifier expressed as an absolute value. A positive output class indicates that this taste profile is part of the class predetermined in the ground truth, and the absolute value is the amount of confidence in that relation between the taste profile and the class. In some aspects, the confidence value associated with the SVM classifier could be used to filter results. For example, results or output could be filtered to only those terms with a confidence level above a set threshold. In such a case, a tradeoff between accuracy and coverage can be managed by varying the threshold.

In one embodiment, a truth table of individual media to best matching VQ code is maintained to go from VQ code probabilities to lists of media in a ranked order.

Feature-based training is thus accomplished by analyzing and cataloguing the features of media items (e.g., artist, song, book, author, producer, actor, etc.) based on, for example, cultural analysis and the properties of the items (e.g., in the case of music or audio channel of a video, the acoustical properties).

After the model has been trained, the system outputs one model for each VQ output represented in FIG. 6 as models 614. The output of the process is a set of 1024 models. In an example implementation, a WTV is calculated for a new (or "evaluation") taste profile 616 as described above with respect to anonymized taste profiles vector quantized for training purposes. The evaluation WTV 618 is then run through all 1024 models concurrently to obtain cross-media recommendations 620.

When a taste profile is run through the model, a confidence metric is also returned, which is scaled, for example, between −1 and 1, where −1 means that the taste profile user will not like the media item and 1 means that the taste profile user will like the media item. Thus if the confidence metric is greater than 0 (>0), then there is a more than likely probability that the user will like the recommendation.

Figure 8:
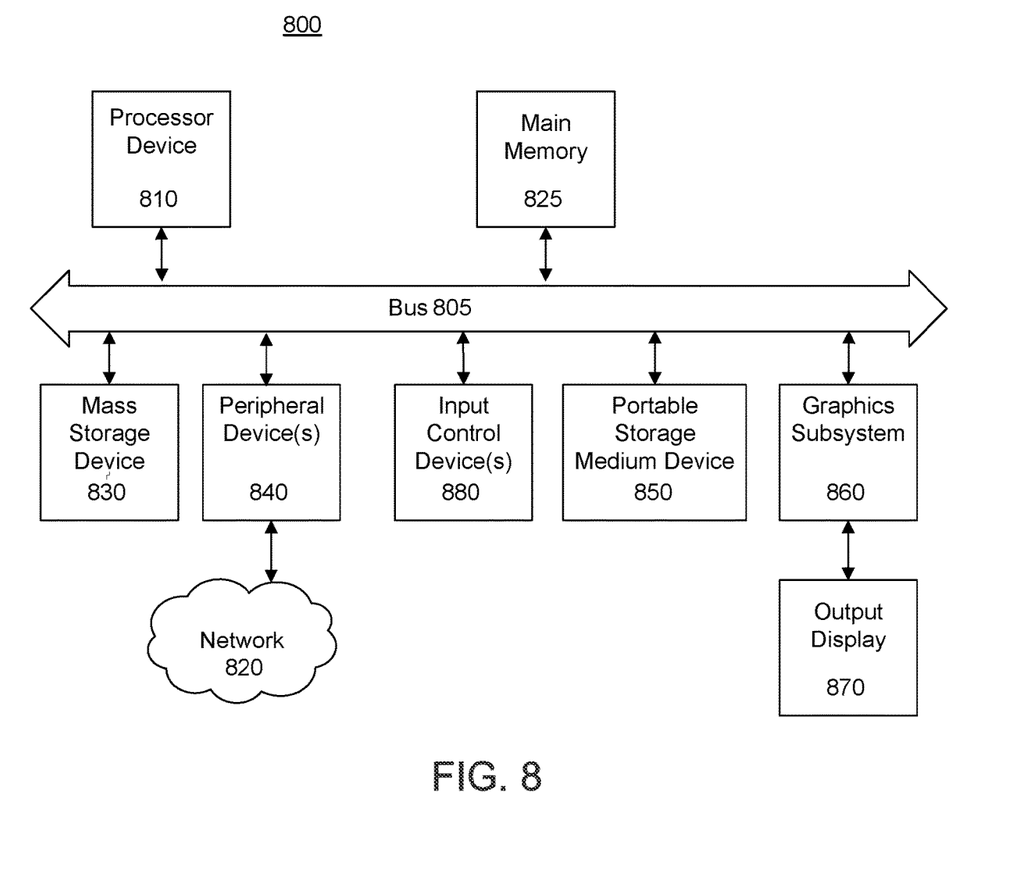
FIG. 8 is a block diagram of a device for use with various example embodiments of the invention.

FIG. 8 is a block diagram of a general and/or special purpose computer 800, which may be a general and/or special purpose computing device, in accordance with some of the example embodiments of the invention. The computer 800 may be, for example, a user device, a user computer, a client computer and/or a server computer, among other things.

The computer 800 may include without limitation a processor device 810, a main memory 825, and an interconnect bus 805. The processor device 810 may include without limitation a single microprocessor, or may include a plurality of microprocessors for configuring the computer 800 as a multi-processor system. The main memory 825 stores, among other things, instructions and/or data for execution by the processor device 810. The main memory 825 may include banks of dynamic random access memory (DRAM), as well as cache memory.

The computer 800 may further include a mass storage device 830, peripheral device(s) 840, portable non-transitory storage medium device(s) 850, input control device(s) 580, a graphics subsystem 860, and/or an output display interface 570. For explanatory purposes, all components in the computer 800 are shown in FIG. 8 as being coupled via the bus 805. However, the computer 800 is not so limited. Devices of the computer 800 may be coupled via one or more data transport means. For example, the processor device 810 and/or the main memory 825 may be coupled via a local microprocessor bus. The mass storage device 830, peripheral device(s) 840, portable storage medium device(s) 850, and/or graphics subsystem 860 may be coupled via one or more input/output (I/O) buses. The mass storage device 830 may be a nonvolatile storage device for storing data and/or instructions for use by the processor device 810. The mass storage device 830 may be implemented, for example, with a magnetic disk drive or an optical disk drive. In a software embodiment, the mass storage device 830 is configured for loading contents of the mass storage device 830 into the main memory 825.

The portable storage medium device 850 operates in conjunction with a nonvolatile portable storage medium, such as, for example, a compact disc read only memory (CD-ROM), to input and output data and code to and from the computer 800. In some embodiments, the software for storing information may be stored on a portable storage medium, and may be inputted into the computer 800 via the portable storage medium device 850. The peripheral device(s) 840 may include any type of computer support device, such as, for example, an input/output (I/O) interface configured to add additional functionality to the computer 800. For example, the peripheral device(s) 840 may include a network interface card for interfacing the computer 800 with a network 820.

The input control device(s) 880 provide a portion of the user interface for a user of the computer 800. The input control device(s) 880 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 800 may include the graphics subsystem 860 and the output display 870. The output display 870 may include a cathode ray tube (CRT) display and/or a liquid crystal display (LCD). The graphics subsystem 860 receives textual and graphical information, and processes the information for output to the output display 870.

Each component of the computer 800 may represent a broad category of a computer component of a general and/or special purpose computer. Components of the computer 800 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-8 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system for cross-media recommendation, comprising:
   a first database operable to store a plurality of user taste profiles corresponding to a first domain;
   a second database operable to store a plurality of media item vectors corresponding to a second domain; and
   at least one processor configured to:
   generate a plurality of weighted term vectors by multiplying, for each term in a user taste profile of the plurality of user taste profiles, an affinity by a probability that the term is associated with a media item;
   generate vector quantized media data by vector quantizing the plurality of media item vectors;
   map the weighted term vectors to the vector quantized media data to form relationships between the user taste profiles and one or more media items;
   train a model based on the map to learn the relationships between the user taste profiles and the one or more media items; and
   apply an evaluation taste profile in the first domain to the model to obtain a media item corresponding to the second domain.

2. The system according to claim 1, wherein the first domain is music and the second domain is any one, or a combination, of books, movies, or games.

3. The system according to claim 1, wherein the at least one processor is further configured to:
   generate a training set based on the plurality of user taste profiles and the plurality of media item vectors, wherein at least a portion of the training set includes ground truths across the first domain and the second domain; and
   train the model with the training set.

4. The system according to claim 1, wherein the at least one processor is further configured to:
   obtain a confidence interval indicating an amount of confidence in a relation between the evaluation taste profile and the media item vector of the media item corresponding to the second domain.

5. A computer-implemented method for cross-media recommendation, comprising:
   storing a plurality of user taste profiles corresponding to a first domain;
   storing a plurality of media item vectors corresponding to a second domain;
   generating a plurality of weighted term vectors by multiplying, for each term in a user taste profile of the plurality of user taste profiles, an affinity by a probability that the term is associated with a media item;
   generating vector quantized media data by vector quantizing the plurality of media item vectors;
   mapping the weighted term vectors to the vector quantized media data to form relationships between the user taste profiles and one or more media items;

training a model based on the map to learn the relationships between the user taste profiles and the one or more media items; and applying an evaluation taste profile in the first domain to the model to obtain a media item corresponding to the second domain.

6. The computer-implemented method according to claim 5, wherein the first domain is music and the second domain is any one, or a combination, of books, movies, or games.

7. The computer-implemented method according to claim 5, further comprising the step of:

generating a training set based on the plurality of user taste profiles and the plurality of media item vectors, wherein at least a portion of the training set includes ground truths across the first domain and second domain; and training the model with the training set.

8. The computer-implemented method according to claim 5, further comprising the step of:

obtaining a confidence interval indicating an amount of confidence in a relation between the evaluation taste profile and the media item vector of the media item corresponding to the second domain.

9. A non-transitory computer-readable medium having stored thereon one or more sequences of instructions for causing one or more processors to perform:

storing a plurality of user taste profiles corresponding to a first domain;

storing a plurality of media item vectors corresponding to a second domain;

generating a plurality of weighted term vectors by multiplying, for each term in a user taste profile of the plurality of user taste profiles, an affinity by a probability that the term is associated with a media item;

generating vector quantized media data by vector quantizing the plurality of media item vectors;

mapping the weighted term vectors to the vector quantized media data to form relationships between the user taste profiles and one or more media items;

training a model based on the map to learn the relationships between the user taste profiles and the one or more media items; and applying an evaluation taste profile in the first domain to the model to obtain a media item corresponding to the second domain.

10. The non-transitory computer-readable medium of claim 9, wherein the first domain is music and the second domain is any one, or a combination, of books, movies, or games.

11. The non-transitory computer-readable medium of claim 9, further having stored thereon a sequence of instructions for causing the one or more processors to perform:

generating a training set based on the plurality of user taste profiles and the plurality of media item vectors, wherein at least a portion of the training set includes ground truths across the first domain and second domain; and training the model with the training set.

12. The non-transitory computer-readable medium of claim 9, further having stored thereon a sequence of instructions for causing the one or more processors to perform:

obtaining a confidence interval indicating an amount of confidence in a relation between the evaluation taste profile and the media item vector of the media item corresponding to the second domain.

\* \* \* \* \*